United States Patent

Nohl et al.

[11] Patent Number: 5,894,525
[45] Date of Patent: Apr. 13, 1999

[54] METHOD AND SYSTEM FOR SIMULTANEOUSLY RECOGNIZING CONTEXTUALLY RELATED INPUT FIELDS FOR A MUTUALLY CONSISTENT INTERPRETATION

[75] Inventors: Craig R. Nohl, Oakhurst; Charles E. Stenard, Princeton, both of N.J.

[73] Assignee: NCR Corporation, Dayton, Ohio

[21] Appl. No.: 08/568,334

[22] Filed: Dec. 6, 1995

[51] Int. Cl.$^6$ .................................................. G06K 9/34
[52] U.S. Cl. ........................... 382/138; 382/178; 382/179; 382/226; 382/229
[58] Field of Search .................................. 382/209, 137, 382/177, 179, 229, 138, 178, 218, 226, 227

[56] References Cited

U.S. PATENT DOCUMENTS

| | | | |
|---|---|---|---|
| 4,754,489 | 6/1988 | Bokser | 382/230 |
| 4,811,412 | 3/1989 | Katsurada | 382/179 |
| 5,034,985 | 7/1985 | Keough | 382/101 |
| 5,093,869 | 3/1992 | Alves et al. | 382/199 |
| 5,146,512 | 9/1992 | Weideman et al. | 382/218 |
| 5,182,656 | 1/1993 | Chevion et al. | 358/452 |
| 5,193,121 | 3/1993 | Elischer et al. | 382/138 |
| 5,239,592 | 8/1993 | Kameyama et al. | 382/136 |
| 5,313,527 | 5/1994 | Guberman et al. | 382/186 |
| 5,487,117 | 1/1996 | Burges et al. | 382/173 |
| 5,559,902 | 9/1996 | Bose et al. | 382/263 |
| 5,787,196 | 7/1998 | Yair et al. | 382/178 |

Primary Examiner—Jon Chang
Attorney, Agent, or Firm—Gregory A. Welte

[57] ABSTRACT

A method and system for simultaneously recognizing contextually related images is disclosed. The image of two separate fields is captured to form two captured data images such as a word and numerical amount. Each captured image is cut to form a segmentation graph based on the cuts. The shortest path in each segmentation graph is found wherein the additive length corresponds to a score and is associated with each directed arc of the segmentation graph. The segmentation graphs are combined into a joint segmentation graph and the highest scoring mutually consistent interpretations are found.

21 Claims, 5 Drawing Sheets

FIG. 1A　　FIG. 1B

METHOD AND SYSTEM FOR SIMULTANEOUSLY RECOGNIZING CONTEXTUALLY RELATED INPUT FIELDS FOR A MUTUALLY CONSISTENT INTERPRETATION

FIELD OF THE INVENTION

This invention relates to a method and system for optically recognizing characters by simultaneously recognizing contextually related images through the use of segmentation graphing.

BACKGROUND OF THE INVENTION

Optical character recognition is becoming more important when processing various documents having various contextually related images. For example, a bank check typically includes a legal amount stated in words and a courtesy amount having a numerical amount written in a box on the bank check. Many prior art optical character recognition techniques, such as the system disclosed in U.S. Pat. No. 5,146,512, issued Sep. 8, 1992, image a field by locating either characters or words and generating a numerical equivalent field such as from the legal amount of a check. This becomes a reference from which a comparison is made with the other set such as the courtesy amount, to determine the accuracy of the imaging.

It would be advantageous to extend comparison between such combinations as an image and a pen-input, the picture of a face and a signature, and perhaps even a portion of audio speech and video of lips moving. It would be desirable if the inputs from two fields such as described could be recognized simultaneously, instead of compared to each other as in previously, described techniques.

SUMMARY OF THE INVENTION

The advantages and features of the present invention now allow for simultaneous recognition of contextually related images such as a word field and an associated numerical field.

In accordance with one aspect of the present invention, the images of two separate fields are captured to form two captured data images. Each captured image is cut to form a segmentation graph based on the cuts. The shortest path in each graph is located wherein an additive length corresponds to a score and is associated with each directed arc of the graph. The graphs are combined into a joint segmentation graph and the highest scoring mutually consistent interpretation is found.

The segmentation graphs include cells corresponding to sub-images bounded by two successive cuts and segments corresponding to sub-images bounded by two adjacent or non-adjacent cuts. The graphs include nodes that are numbered by the number of cells processed in a first image and the number of cells processed in a second image.

In one aspect of the present invention, the contextually related images comprise a word field and an associated numerical field. The word field can be the legal amount on a bank check and the numerical field can be the courtesy amount. The nodes of the segmentation graph are numbered by the number of cells processed in the courtesy amount image and the number of cells processed in the legal amount image. The nodes can also be numbered by the number of digits returned for the courtesy amount image when traversing the graph and the number of words returned for the legal amount image when traversing the graph.

DESCRIPTION OF THE DRAWINGS

The foregoing advantages and features of the present invention will be appreciated more fully from the following description, with reference to the accompanying drawings, in which:

FIG. 1A is an enlarged view of the legal amount of a check.

FIG. 1B is an enlarged view of the courtesy amount of a check.

DETAILED DESCRIPTION OF THE INVENTION

Figure 1:
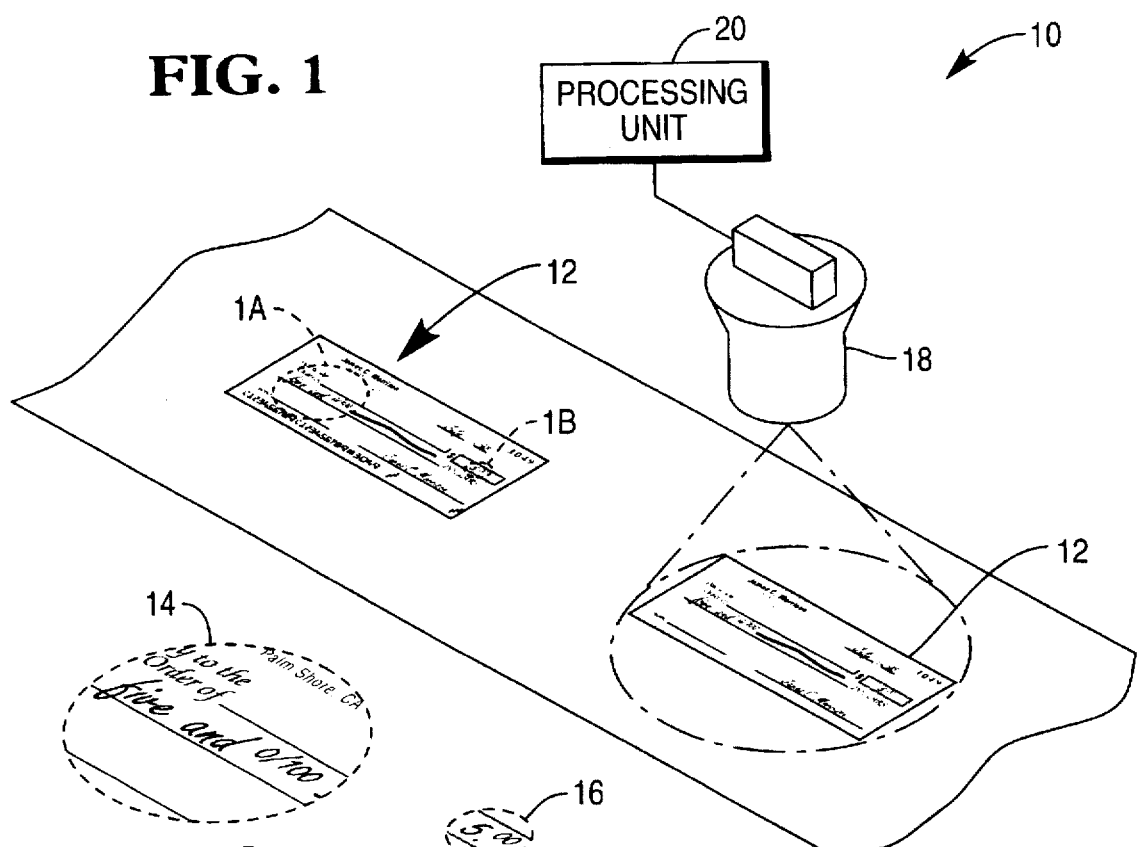
FIG. 1 illustrates a system used for imaging the legal word and courtesy numeric amounts of a check.

Referring now to FIG. 1, there is illustrated a system, indicated generally at 10, used for simultaneously recognizing contextually related images such as the legal and courtesy amounts of a check. As illustrated, a check 12 is scanned and using known techniques, a pixel map is made of the legal amount 14 on the check corresponding to a first field and a pixel map is made of a second field corresponding to the courtesy amount 16 of the check 12. FIG. 1A illustrates a blow-up of the legal amount 14 and is illustrated as "five and %100". The FIG. 1B illustrates a blow-up of the courtesy amount 16 and is illustrated as "5.$^{00}$". A scanner 18 makes an image of the fields while a processing unit 20, such as a minicomputer, cuts segments and forms the joint segmentation graph as explained further below.

Figure 2:
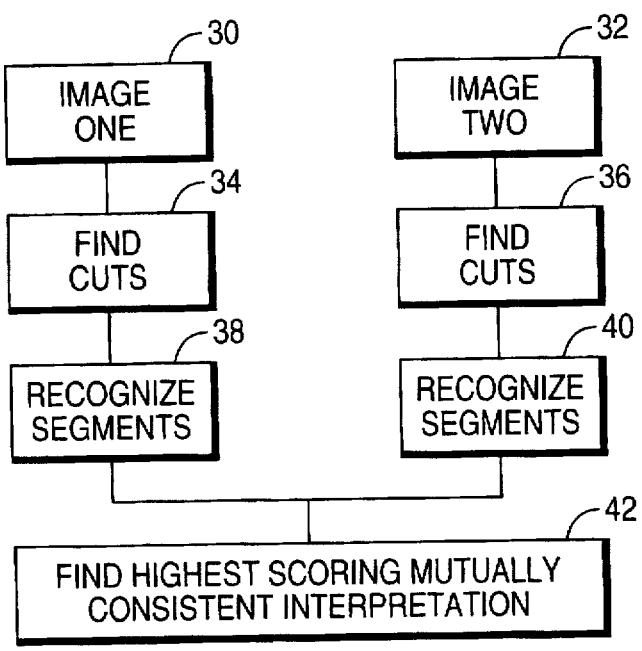
FIG. 2 is a high level block diagram illustrating the method of simultaneously recognizing two contextually related images in accordance with the present invention.

FIG. 2 illustrates a block diagram flow chart of the basic steps used in the present invention relative to the described check example. Images are lifted from the checks, (Blocks 30 and 32) corresponding to the legal and courtesy amounts of the check 12. Cuts are produced and found (Blocks 34 and 36) and the segments are recognized (Blocks 38 and 40) through the use of segmentation graphs. In Block 42, the highest scoring mutually consistent interpretations are found by the use of a joint segmentation graph.

It should be understood that the field inputs used with the present invention can be more than the courtesy and legal amounts of a check. Each field can correspond to an input that in the present invention is a pixel map. Also, one field could be electronic ink, and another field could be the sequence of X and Y movements of a pen that moves as a function of time. These examples are all legitimate fields which can be used as inputs for the present invention.

The important characteristics can include one or more representations of symbols, like a character. The courtesy amount field 16 may contain symbols for various digits, including a decimal point and dollar sign as well as other items. Other fields may include such means as electronic ink, which is generated from someone writing a pen on an input pad. This is a very different representation from the courtesy amount of a check, but this representation also has symbols. The input can be hand-printed characters, cursive word, or an icon. The input does not necessarily have to be a standard character, but could be a symbol for a resistor or capacitor.

Typically, the techniques of the present invention, as will be explained below, can be used with many different types of symbols in a field having a natural way of being ordered. This can include electronic ink and photographs. Once the image is made or the field recognized, the field is then segmented by the processor making cuts through the image.

Figure 3:
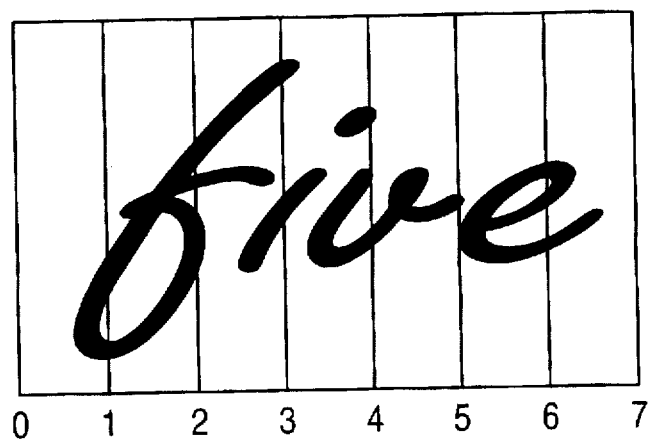
FIG. 3 is a schematic view showing the cutting of the word "five" into mutually exclusive fields.
Figure 5:
FIG. 5 is a schematic view showing the cutting of the word "five" so that the fields overlap with each other.

The segmentation does not have to divide the input image into mutually exclusive fields (FIG. 3) but the fields can overlap (FIG. 5). For example, when a complex script word like the numeral "five" and the legal amount "5" is imaged, both can be cut into segments with various concatenations of smaller and larger segments. FIGS. 3 and 5 represent various depictions of how the word "five" can be cut. FIG. 5 illustrates the field overlapping to each other while FIG. 3 shows mutually exclusive fields.

Figure 4:
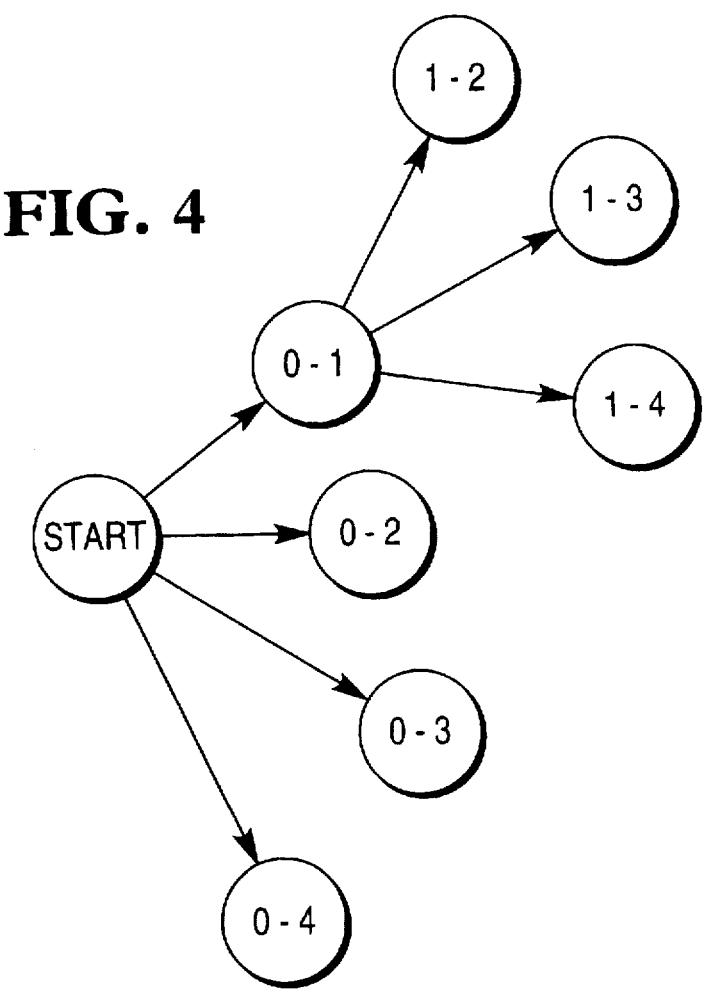
FIG. 4 is a partial, schematic segmentation graph for the word "five" of FIG. 3 been cut into mutually exclusive fields.
Figure 6:
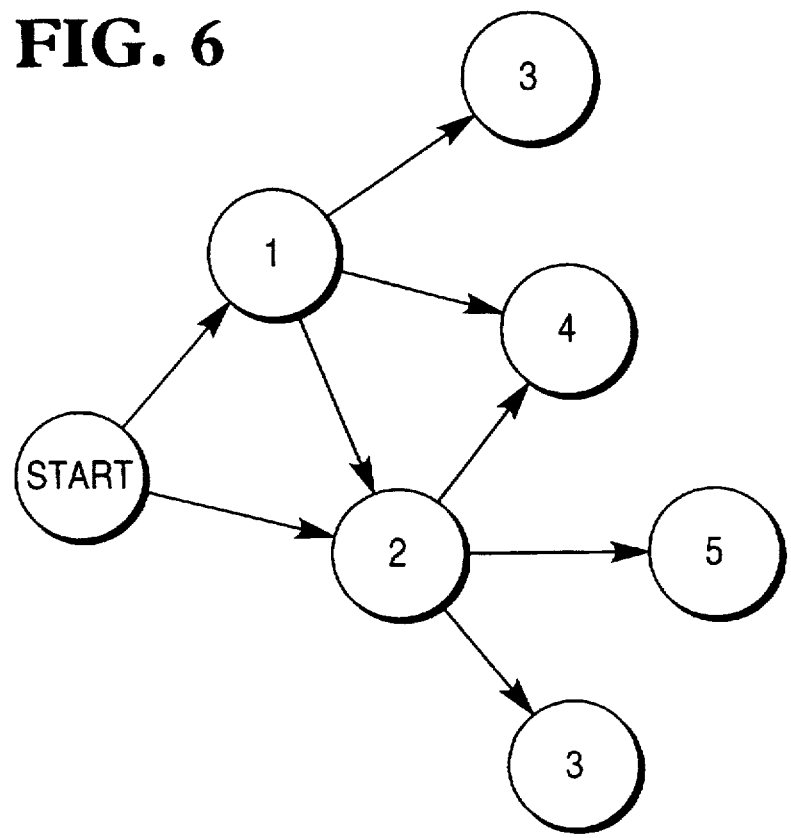
FIG. 6 is a partial, schematic segmentation graph for the overlapping fields of FIG. 5.

FIGS. 4 and 6 represent partial segmentation graphs for the word "five" which has been cut in the format of FIGS. 3 and 5. The segmentation graphs illustrate the start position and a number of possible ordering of segments with the graph. Each graph also has nodes which can be numbered 1 though n. For example, segment 1 could be followed by segment 3, segment 2 or segment 4. Segment 2 could be followed by segment 3 but if segment 3 comes after segment 2, then there are a different set of possibilities than if segment 3 came after segment 1. All these possibilities can be represented by the segmentation graph. The segmentation graph and illustrated cuts through the numeral "five" of FIG. 3 and 5, and represent a more conventional means of taking an image and dividing it into mutually exclusive parts. A segment has an image which lies between two cuts, for example, 0 to 1, 0 to 2, or 0 to 3. It make take three of the smaller regions of segments to obtain a letter, such as the letter "f" of the word "five". By drawing a segmentation graph, it can seen that 0 to 1 may be an allowed first segment, 0 to 2 may be an allowed first segment or 0 to 3 may be an allowed first segment.

Most importantly, each segment pulls something out of the field whether pixels or electronic ink. Each node is connected by an arrow and an allowed path goes from the start node to the end node and can travel only along arrows. Thus, there are certain sequences of segments that are allowed. These and other sequences would not be considered. The processor completes the path of the segments from the start to the end in one way and then in a different way. A dynamic algorithm program, such as Dynamic Dykstra or similar dynamic programming method is used in the processing unit 20 to find the shortest path within two graphs similar to these graphs.

From this information concerning multiple fields, a joint consistent interpretation of multiple fields is obtained. The processor is programmed so that it determines what the segments are, given the input. The processor inputs a segment and set of possible classes of symbols which may be represented by the segment. This could be the digits "0" through "9" or letters "a" through "z" of any other symbols. For each of these symbols for that segment, the processing unit 20 performs a scorer function that gives a score which is the match between that segment and that particular symbol which is referred to as a class. For example, there could be a set of twenty symbols and each one of those symbols would be one of the classes, similar to a neural net. For example, a group of pixels can be analyzed to be either a 0, 1, 2, . . . , 9. A score is obtained if that group of pixels is a "0" or a "1", all the way through to the number "9". This is known as a recognizer or scorer, acting similar to a probability calculation.

The processor then conducts a segment sequencer function which decides what is to follow in the segmentation graph. The processor determines how the graphs for field 1 or field 2 are consistent with each other. Larger graphs are more complete and give better results, because the optimal solution is more reachable.

Figure 7:
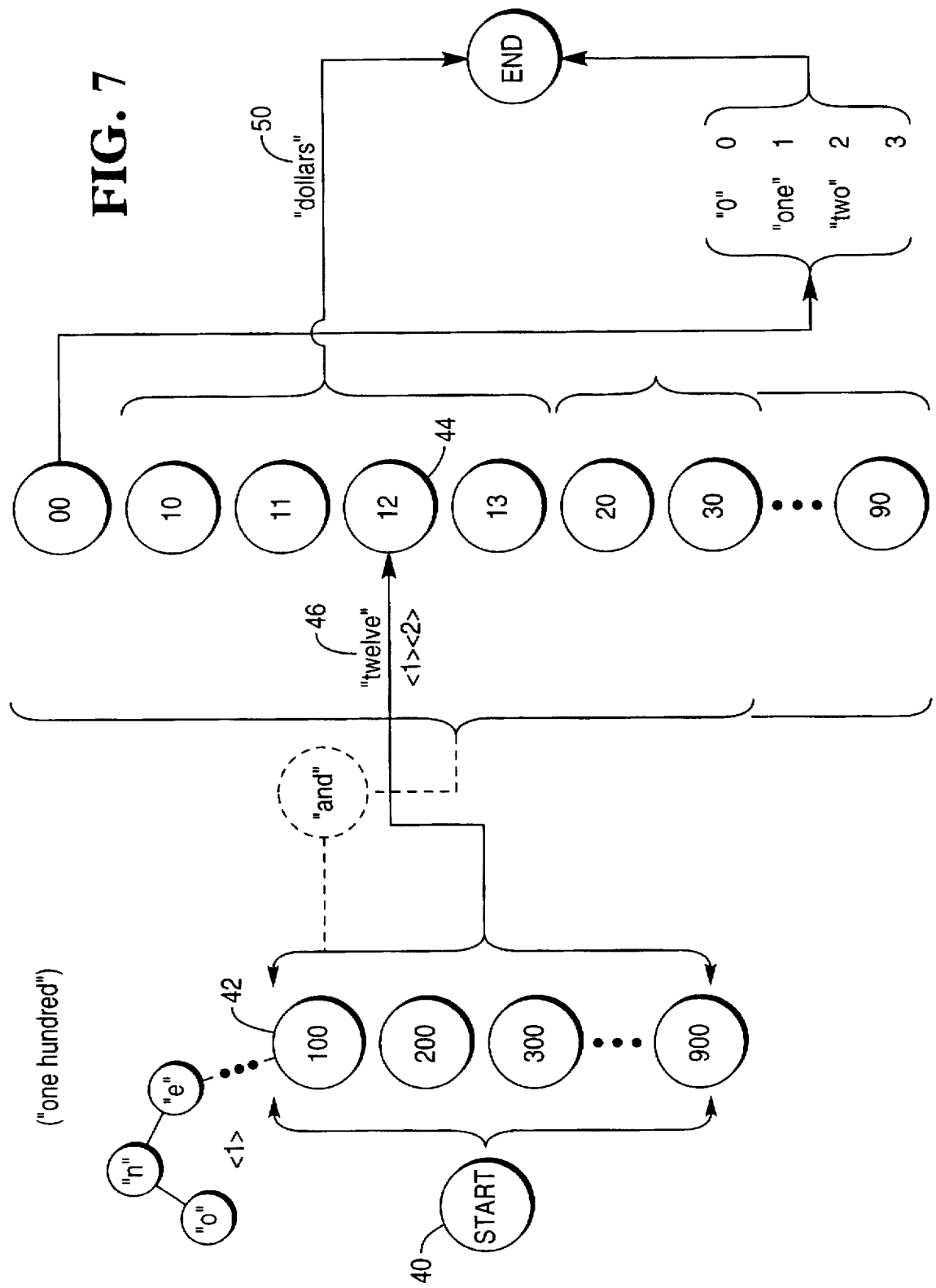
FIG. 7 is a matching graph illustrating the method of the present invention and more particularly related to the segmentation of legal and courtesy amounts of a check.

FIG. 7 discloses a matching, joint segmentation graph for numbers 00 through 100. This joint segmentation graph constructed from the segmentation graphs of each field and the scores obtained from those graphs. This joint segmentation graph explains what has to happen in field 1 and field 2 in order to have a legitimate joint consistent interpretation of both fields. Each node in this graph is represented by the circles and corresponds to a partial joint interpretation state. This graph shows what transitions among the states are allowed and which are not allowed. By starting at the start position node 40, the various inputs can be interpreted.

For example, field 1 may require the input of two words such as "one hundred" in order to go from the start to the node 42 labeled "100". The labels from these nodes can be used to construct the joint interpretation. To get to the "100" node the word "one hundred" must be obtained off the legal amount. Also, the numeral "1" must be obtained from the courtesy amount. Each of the transitions in the graph will have two kinds of symbols attached to it. One is the symbol from field 1 and the other is a symbol from field 2.

In this example, the number desired is "112". The next node 44 in the graph would be the node labeled 12. Thus, the word "twelve" 46 would have to be seen as the legal amount, and the number "12" would have to be seen in the courtesy amount. Decimal points are not located and used in this example, thus not necessary to locate in the joint segmentation graph. The graph may require that the processing unit 20 recognize "dollars" 50 out of the legal amount in order to get to the end. If there is another digit such as 5 then there is no way the path could continue.

This is an example of processing the segmentations of each field by matching them against the joint segmentation graph. The processing unit 20 maintains track of all paths that are not yet terminated and for each one of these paths a score is constructed. For as many as a million paths in some joint segmentation graphs, it is and hoped that only one good score will be obtained. Also, not every path has to be constructed. The standard dynamic programming techniques are followed, as in the Dynamic Dykstra programming method, which does not require every path to be constructed. Thus, the fields have been optimally divided into segments to give the best joint answer, as opposed to taking the best answer from each one. This technique is more preferable than some older prior art techniques such as in the aforementioned '512 patent where two fields are recognized, and a set of alternatives generated for what that field might be, while testing that result against the other field. In the present method of the invention there is no interpretation of either field until the best joint interpretation is obtained. Thus, one field is not interpreted against the other as in the prior art.

In the above check example, in the graph of FIG. 7, other words such as "and" could be included. Instead of the processing unit finding a path directly into the node "12", the processing unit seeks first through an "and" node 60 as illustrated in the dotted lines of FIG. 7.

Figure 8:
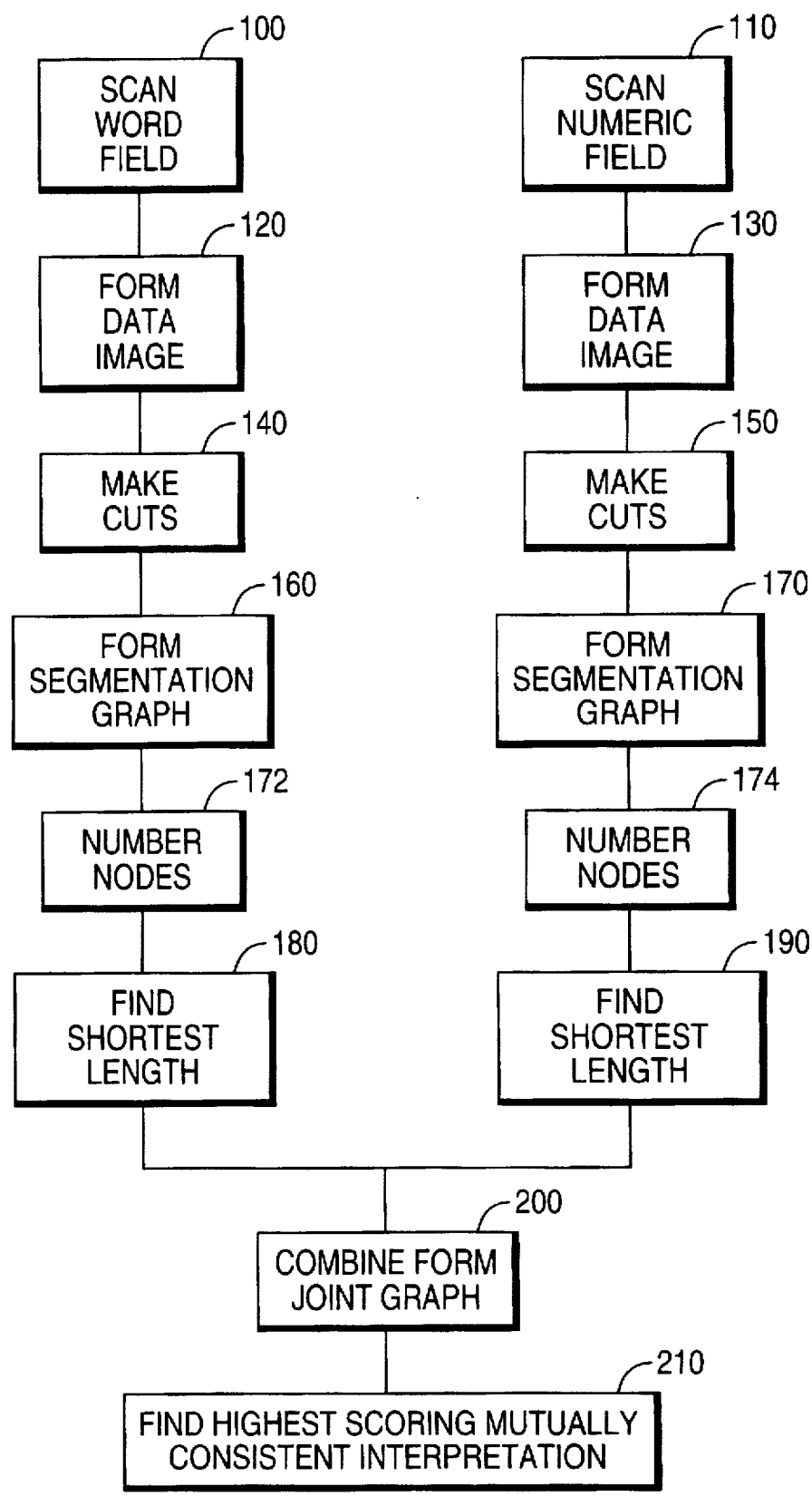
FIG. 8 is a high level flow chart illustrating the method of the present invention.

Referring now to FIG. 8 a flow chart is illustrated depicting the method of the present invention such as used for determining legal and courtesy amounts of bank checks. As shown in Block 100, a word field is scanned. Simultaneously, an associated numerical field (Block 110) is scanned and pixel data images for each word (Block 120) and associated numerical (Block 130) fields are formed. The word field comprises the legal amount of the bank check and the numerical field comprises the courtesy amount of the bank check.

Each pixel image is cut (Blocks 140 and 150) to form a segmentation graph (Blocks 160 and 170) based on the cut. The nodes can be numbered by the number of digits returned for the courtesy amount image which are traversing the graph (Block 172) and the number of processed cells and words returned for the legal amount image traversing the graph (Block 174). Nodes are numbered by the number of cells processed in a first image and the number of cells processed on the second image. The shortest path in each graph is found at an arc length corresponding to a score as associated with each directed arc of the graph (Blocks 180 and 190). Cells corresponding to sub-images are bounded by two successive cuts, and segments corresponding to sub-images are bounded by two adjacent or non-adjacent cuts. The graphs are then combined into a joint segmentation graph (Block 200) and the highest scoring mutually consistent interpretation is found (Block 210).

It should be understood that the foregoing description of the invention is intended to be illustrative thereof, and other embodiments, modifications, and equivalents may be apparent to those skilled in the art without departing from its spirit.

That which is claimed is:

1. A method of simultaneously recognizing contextually related images comprising the steps of capturing the image of two separate fields to form two captured data images, cutting each captured image and forming a segmentation graph based on the cuts, finding the shortest path in each segmentation graph wherein an additive length corresponds to a score and is associated with each directed arc of a segmentation graph, combining the segmentation graphs into a joint segmentation graph, and finding the highest scoring mutually consistent interpretations.

2. The method according to claim 1 wherein the segmentation graphs include cells corresponding to sub-images bounded by two successive cuts, and segments corresponding to sub-images bounded by two adjacent or non-adjacent cuts.

3. The method according to claim 1 wherein the graphs include nodes, and including numbering the nodes by the number of cells processed in a first image and the number of cells processed in a second image.

4. A method of simultaneously recognizing contextually related images of a word field and an associated numerical field comprising the steps of scanning a word field and associated numerical field and forming a pixel data image for each word and associated numerical field, cutting each pixel formed image and forming a segmentation graphs based on the cuts, finding the shortest path in each segmentation graph wherein an additive length corresponds to a score and is associated with each directed arc of the segmentation graph, combining the segmentation graphs into a joint segmentation graph, and finding the highest scoring mutually consistent interpretations.

5. The method according to claim 4 wherein the graphs include cells corresponding to sub-images bounded by two successive cuts and segments corresponding to sub-images bounded by two adjacent or non-adjacent cuts.

6. The method according to claim 5 wherein the graphs include nodes and including numbering the nodes by the number of cells processed in a first image and the number of cells processed in a second image.

7. The method according to claim 6 wherein the word field comprises the legal amount on a bank check and the numerical field comprises the courtesy amount on a bank check.

8. The method according to claim 7 including the step of numbering the nodes by the number of cells processed in the courtesy amount image and the number of cells processed in the legal amount of the image.

9. The method according to claim 8 including the step of numbering the nodes according to the number of digits returned for the courtesy amount image when traversing the graph and the number of words returned for the legal amount image when traversing the graph.

10. A method of simultaneously recognizing contextually related input fields comprising the steps of extracting one or more segments from each field, interpreting the segments as representing one of a set of symbol classes which for each input of a segment produces a score for interpreting the segment as representing the class, producing a segmentation graph for each field, producing a joint segmentation graph based on individual segmentation graphs, and jointly interpreting the graphs for the highest scoring mutually consistent interpretation.

11. The method according to claim 10 wherein the segmentation graphs includes nodes, including specifying allowed sequences of segments by numbering the nodes by a segment identifier.

12. The method according to claim 11 including specifying for each node a list of all nodes that can be reached from it by transversing a single directed arc.

13. A system for simultaneously recognizing contextually related images comprising means for capturing the image of two separate fields to form two captured data images, means for cutting each captured image and forming a segmentation graph based on the cuts, means for finding the shortest path in each segmentation graph wherein an additive length corresponds to a score and is associated with each directed arc of the segmentation graph, means for combining the segmentation graphs into a joint segmentation graph, and means for finding the highest scoring mutually consistent interpretations.

14. The system according to claim 13 wherein the segmentation graphs further comprise cells corresponding to sub-images by two successive cuts and segments corresponding to sub-images bounded by two adjacent or non-adjacent cuts.

15. The system according to claim 13 wherein the segmentation graphs include nodes that are numbered by the number of cells processed in a first image and the number of cells processed in a second image.

16. The system of simultaneously recognizing contextually related images of a word field and an associated numerical field comprising
- means for scanning a word field and an associated numerical field and forming a pixel data image for each word and associated numerical field,
- means for cutting each captured pixel image and forming a segmentation graph based on the cuts,
- means for finding the shortest path in each segmentation graph wherein an additive length corresponds to a score and is associated with each directed arc of the graph,
- means for combining the segmentation graphs into a joint segmentation graph, and
- means for finding the highest scoring mutually consistent interpretations.

17. The system according to claim 16 wherein the segmentation graphs comprise cells corresponding to sub-images bounded by two successive cuts and segments corresponding to sub-images bounded by two adjacent or non-adjacent cuts.

18. The system according to claim 17 wherein the segmentation graphs include nodes and including means for numbering the nodes by the number of cells processed in a first image and the number of cells processed in a second image.

19. The system according to claim 18 wherein the word field comprises the legal amount on a bank check and the numerical field comprises the courtesy amount on a bank check.

20. The system according to claim 19 including means for numbering the nodes by the number of cells processed in the courtesy amount image and the number of cells processed in the legal amount image.

21. The system according to claim 20 including means for numbering the nodes by the number of digits returned for the courtesy amount image when traversing the graph and the number of words returned for the legal amount image when traversing the graph.

* * * * *

UNITED STATES PATENT AND TRADEMARK OFFICE
CERTIFICATE OF CORRECTION

PATENT NO. : 5,894,525
DATED : April 13, 1999
INVENTOR(S) : Craig R. Nohl et al.

It is certified that error appears in the above-indentified patent and that said Letters Patent is hereby corrected as shown below:

Column 6, line 1, before "pixel" insert --formed-- and after "pixel" delete "formed".

Column 6, line 1, delete "a" before "segmentation".

Signed and Sealed this

Ninth Day of May, 2000

Q. TODD DICKINSON

*Attest:*

*Attesting Officer*  *Director of Patents and Trademarks*